Aug. 11, 1931.                C. BURKART                1,818,460
                           MEASURING DISPENSER
                          Filed Feb. 15, 1929
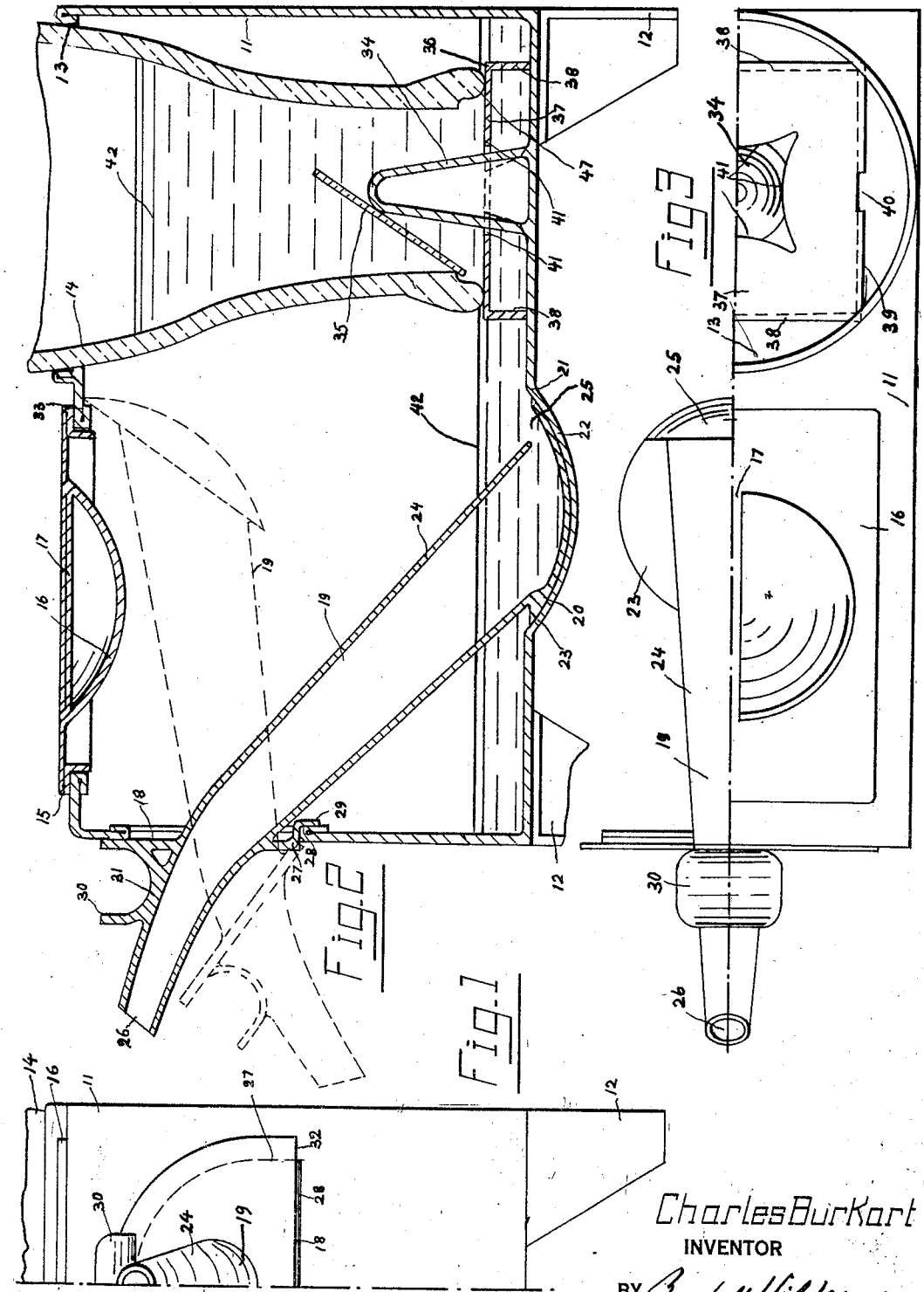
Charles Burkart
INVENTOR
BY Rudolf Hildermann
his ATTORNEY Patented Aug. 11, 1931

1,818,460

UNITED STATES PATENT OFFICE

CHARLES BURKART, OF CLASSON POINT, NEW YORK

MEASURING DISPENSER

Application filed February 15, 1929. Serial No. 340,054.

My invention refers to measuring dispensers for liquids. It concerns primarily the dispensing of liquids which serve as foods or refreshments, milk or cream for instance, and some of its objects are, first, to provide a device into which a container of liquids may be set so that the liquid flows therefrom as needed; second, to provide a device into which flows liquid from a liquid container set thereinto, said liquid being fully protected from contamination by impurities in the space or air surrounding said device; third, to provide a device from which, in measured quantities, may be dispensed the liquid flowing into said device from a container set thereinto; fourth, to provide a dispenser for liquids from which by the tilting of a spout, substantially the same quantity of liquid may be dispensed each time; fifth, to limit the size of such a dispenser so as to facilitate cooling of the liquid contained therein; sixth, to construct a measuring dispenser in an open manner so that all the parts thereof may be readily cleaned or sterilized without mechanical disassembling; seventh, to provide a measuring dispenser in which the quantities dispensed may be changed from one fixed amount to another without any mechanical operations; eighth, to provide a measuring dispenser in which the container supplying the liquid, when empty may be readily replaced by a new one; ninth, to provide a measuring dispenser which readily allows observation of the quantity of liquid contained therein; tenth, to provide a measuring dispenser in which the replacement of the supply containers may be brought about without interrupting the dispensing operation.

These and other objects I attain by the device illustrated in the accompanying drawings. The modification of my device shown is principally adapted for the dispensation of milk and especially cream, from a milk bottle into small cups. In the drawings:

Figure 1 is a substantially bi-sected front view of my improvements.

Figure 2 is a sectional side elevation.

Figure 3 shows a top view in which the container is bi-sected but the dispensing cup is shown in full.

Similar numerals refer to similar parts throughout the various views.

The major parts making up my device are a substantially rectangular and closed housing 11 supported by four feet 12. There are three openings in the housing, a round opening 13, on the top, which serves to receive the inverted milk bottle 14; (the milk bottle is not shown in Figure 3); a square opening 15 on the top of the housing, next to said round opening 13, provided with a loose cover 16, on whch is a cross piece 17 above a depression in said cover, which serves as a means to grasp said cover; and a substantially half round opening 18 in the front of the device into which fits the dispensing cup 19.

The dispensing cup 19 has a spherical segment 20 at its lower end which fits into and below the upper edge 21 of the correspondingly concave depression 22 on the inside of the housing. Just below said edge 21 the spherical segment 20 is partly closed by a horizontal piece 23 from which extends, at an angle, the dispensing spout 24. The enclosure on the lower end of the dispensing cup, formed by the spherical segment 20, by the cross piece 23 and by the spout 24 has an opening 25 at its right side which is provided therein by the sectioning away of part of the cross piece, between the point where the spout merges therein and the circular edge of the spherical segment. The spout 24 extends through the opening 18 in the housing; it is bent at a slight angle downward at its upper end and it is cut off at the end 26 at an angle which is chosen in such a way as to provide a ready flow of a liquid from said spout without leaving drops on the edge of said opening when the flow of the liquid is interrupted. At the point where the spout 24 passes through opening 18, its outer wall merges into a substantially semi-circular cover 27 which overlaps the circular edge of opening 18 but which is narrowed at its lower end to the width of the straight edge 28 of opening 18 and is bent at an angle to extend over said straight edge 28; it is long enough to extend downward, on the inside of the housing, next to said straight edge, with a lip 29. On the upper end of cover 27 is an extension 30 which is bent into trough-shape so as to fit the finger of the operator. At the point 31 where the extension 30 touches the spout 24 it is suitably connected thereto. Gripping extension 30 with the finger at the point where it is trough-shaped and pulling it down, the operator will swing the whole dispensing cup 19 around the straight edge 28 of the semi-circular opening 18, a quasi-hinge being provided at that point, the lip 29 and the recess 32 between the circular edge of cover 27 and the lip 28 serving to retain the cover at said quasi-hinge. The dispensing cup may be swung around said quasi-hinge until the spherical segment 20, next to opening 25, strikes the top of the housing at a point 33 between the square and round openings in said top. The dispensing cup is shown in this latter position by dotted lines in Figure 2.

From the bottom of the housing arises a cone 34 which extends partly into the bottle 14 and which pushes aside the paper cover 35 of said bottle, into the position shown, when the bottle is set into the housing over cone 34. The lower edge of bottle 14 rests upon a square stand 36 which is a loose piece, with a top 37, with a front and back 38 and with sides 39. The sides 39 are cut away, near their centers, small openings 40 thus being provided below the stand. An opening is cut into the top 37 of the stand. The edges 41 of said opening extend towards the center and serve to retain the stand in a fixed position next to the cone 34.

My device functions as follows:

A milk bottle 14 containing milk 42 is inserted, upside down, into the housing through the opening 13 therein. Milk bottles are ordinarily closed on the top by paper covers. Such a cover is indicated at 35. When the bottle is set down over the cone 34, said cone pushes said paper cover 35 out of the way into the position shown, and the opening of the bottle comes to rest upon stand 36. Of course the milk now flows out of the lower end of the bottle and fills the bottom of the housing, the milk in the housing rising until the lower end of the bottle is sealed thereby and the pressures in the bottle and next to the bottle, at the level of the surface of the milk, are balanced. When milk is removed from the supply at the bottom of the container, air will enter the milk bottle, through its opening, whenever the level of the milk in the housing becomes low enough to break the seal of the liquid at the lower edge of the bottle. A quantity of milk, corresponding to the volume of air which has been admitted to the bottle, flows into the housing and the surface of the milk in the housing assumes substantially the same level as before. Whenever milk is removed from the housing, said supply of milk is thus replenished from the milk bottle and the surface of said supply of milk maintains substantially the same level until the milk bottle 14 is empty, whereupon the bottle may be replaced by a full one.

Of course it is not necessary that the milk bottles be provided with covers 35 when inserted into the housing. With a certain amount of skill, the operator can insert a bottle, without a cover, into the position of bottle 14, quick action in this operation preventing an excess of milk from flowing from said bottle. It is quite clear from the above that my method of maintaining a substantially even level of liquid in the housing, as supplied from an inverted container set into it, does not have to be limited to bottles of the kind described but may be accomplished with any kind of a container with a reasonably small opening at the bottom. For the preservation of the liquid in the housing and in the container, cooling means, as known in this art, may be applied to the container, to the housing, or to both, and the liquid may then be dispensed at a more desirable lower temperature.

It will be seen that the level of the liquid 42 in the housing is substantially governed by the height of the stand 36. Therefore I make this stand removable, being inserted into the housing as a separate part, and centrally retained by edges 41 at the position where it serves as a rest for a container inserted into said housing.

The dispensing of a measured quantity of liquid from the housing proceeds as follows:

The weight of the dispensing cup 19 is such that it normally assumes the position in which it is shown in full lines in Figure 2. In that position the spherical segment is submerged in the liquid in the container and it is filled with liquid up to the same level as the housing, a free balancing of the liquid in and around the dispensing cup being allowed by the opening 25 in the dispensing cup. Since the level of the liquid 42 in the housing remains substantially the same, a substantially equal amount of liquid is always contained in the dispensing cup when in its position at rest. That amount is carried upward, when the operator grips the rest 30 and pulls down the upper end of the dispensing cup, said dispensing cup swinging around its fulcrum point at edge 28 until the spherical segment strikes the top of the housing at 33. While the dispensing cup thus swings upward, the operator brings the container, into which the liquid is to be dispensed, into a position below the opening 26 of the dispensing cup and the liquid which has been carried upward by the cup, flows from said opening into said container. When the dispensing has been finished the operator releases the dispensing cup and it returns into its normal position 19 shown in full lines in Figure 2.

My device is to be used to dispense specific amounts of liquid. It is seen from the above that the amount of liquid dispensed by the container is substantially uniform since the top level of the liquid contained in the housing remains substantially the same as long as it is replenished from a suitable source. If the quantity of liquid dispensed from my device is to be changed,—when, for instance, the containers to be filled are larger or smaller,—I replace the stand 36 by another stand which is correspondingly higher or lower, the normal level of the liquid in the housing thereby being raised or lowered.

In the development of my invention I have paid particular attention to the necessity of cleaning all parts of the device at frequent intervals. It is observed that this may readily be done, since the inside of the housing has a very simple outline and can be readily reached through the two openings on its top. The swinging dispensing cup may be readily removed from the housing by simply lifting it out of its quasi-hinge at the edge 28. If the cleaning of the dispensing cup is to be still further simplified, said cup may be arranged in two parts, one of these parts being the spout together with the parts attached to its upper end and together with the piece 23 at the lower end, the other part being the spherical segment 20. The assembling of these two parts may be brought about by a catch or lock or by a thread.

The spherical segment is of course the part which primarily governs the amount of cream or other liquids dispensed. When said spherical segment is of such a size that it just takes the amount of liquid to be dispensed, the stand 36 is made as low as possible, i. e., so that it just raises the container 13 from the bottom of the housing. It then will allow the liquid to pass from the bottom of said container into the housing. In such a case ideal conditions are obtained, because there will be substantially no liquid on the floor of the housing except in the concave recess 22 or in the spherical segment 20, when the dispensing cup 19 is in the normal position shown in Figure 2. In dispensing cream, the customary measure for cups is ¾ ounce. For dispensing cream I shall therefore make the spherical segment of a size convenient to take that amount of cream. If that measure is to be increased such variation may be readily brought about by making the stand 36 of such height as to bring about the dispensing of the desired amount. To reduce to a minimum the amount of milk or cream standing on the bottom of the housing, I may arrange the bottom of the housing at an incline, all the cream standing in the housing being thus drained into the concave recess 22.

Although I have shown and described one form of an embodiment of my invention in great detail, yet, I do not wish to be limited thereby, except as the state of the art and the appended claims may require, for it is obvious that various modifications and changes may be made in the organization, construction and parts of my invention, without departing from the spirit thereof.

I claim:

1. In combination with a measuring device for dispensing liquids from a container, a substantially closed housing, a dispensing cup rockably hinged into the wall of said housing and comprising a liquid receiving compartment on the inside of said housing and liquid dispensing means on the outside of said housing adapted to dispense measured, predetermined quantities of liquid from within said housing, and a stand for said container within said housing removably supported on the bottom thereof.

2. In combination with a measuring device for dispensing liquids from a container, a substantially closed housing, a dispensing cup hinged into the wall of said housing and comprising a liquid receiving compartment on the inside of said housing and liquid dispensing means on the outside of said housing, and a removable stand for said container in said housing.

3. In combination with a measuring device for dispensing liquids from a container, a substantially closed housing, a dispensing cup hinged into the wall of said housing and comprising a liquid receiving compartment on the inside of said housing and liquid dispensing means on the outside of said housing, guide means for said container extending vertically upward in said housing, and a removable stand for said container surrounding said guide means.

4. In combination with a measuring device for dispensing liquids from a container, a liquid containing housing having a normally substantially closed top portion, means within said housing on the bottom thereof for supporting said container therein in inverted position, a dispensing cup comprising a compartment on the inside of said housing, a spout connected to said compartment providing a cover partly closing the top thereof and extending to the outside of said housing, and means on said spout rockably and removably supporting said cup within a side of said housing, whereby said cup is adapted to dispense measured, predetermined quantities of liquid from within said housing.

5. In a device for dispensing liquids, the combination of a liquid containing housing having a normally substantially closed top portion, an aperture in said housing to receive a liquid container in inverted position, means inside said housing to support the outlet of said container at a predetermined, variable height, guide means inside said housing to adjust the orifice of said container upon said support, a dispensing cup, rockably and removably mounted in and forming part of a wall of said housing, and comprising a liquid receiving compartment inside said housing, and liquid dispensing means connected to said compartment and providing a cover partly closing the top thereof and extending outside said housing, whereby said cup is adapted to dispense measured, predetermined, variable quantities of liquid from within said housing, and a depression in the bottom of said housing, whereinto said compartment is adapted to register.

6. In combination with a measuring device for dispensing liquids from a container, a liquid containing housing having a normally substantially closed top portion, a door rockably hinged into and forming part of the wall of said housing, a cup adapted to measure and dispense predetermined quantities of liquid from within said housing, mounted in said door and comprising a liquid receiving compartment on the inside of said housing, and liquid dispensing means connected to said cup and extending outside of said housing.

7. In combination with a measuring device for dispensing liquids from a container, a liquid containing housing having a normally substantially closed top portion, a door rockably and removably hinged into and forming part of the wall of said housing, a cup adapted to measure and dispense predetermined quantities of liquid from within said housing, mounted in said door and comprising a liquid receiving compartment on the inside of said housing, liquid dispensing means connected to said cup and extending outside of said housing, and a depression in the bottom of said housing accommodating said cup.

8. In combination with a measuring device for dispensing liquids from a container, a liquid containing housing having a normally substantially closed top portion, a cup adapted to measure and dispense predetermined quantities of liquid from within said housing, rockably hinged into the wall of said housing and comprising a liquid receiving compartment on the inside of said housing, liquid dispensing means connected to said cup and extending outside of said housing, and guide means for said container within said housing, extending vertically upward upon and forming a part of the bottom of said housing.

9. In combination with a measuring device for dispensing liquids from a container, a liquid containing housing having a normally substantially closed top portion, a cup adapted to measure and dispense predetermined quantities of liquid from within said housing, rockably hinged into and forming a detachable part of the wall of said housing and comprising a liquid receiving compartment on the inside of said housing, having a cover partially closing the top thereof, liquid dispensing means extending from the top of said compartment to the outside of said housing, and a depression in the bottom of said housing, whereinto said compartment is seated and accommodated.

Signed at New York, in the county of New York and State of New York this 13th day of February, A. D. 1929.

CHARLES BURKART.